(12) United States Patent
Ferreira et al.

(10) Patent No.: US 10,994,167 B1
(45) Date of Patent: May 4, 2021

(54) SWINGING AND CLIMBING APPARATUS WITH VERTICALLY SUPPORTED PARALLEL WEBBING

(71) Applicants: Michael Ferreira, Elmhurst, NY (US); Eric Burt, Brooklyn, NY (US)

(72) Inventors: Michael Ferreira, Elmhurst, NY (US); Eric Burt, Brooklyn, NY (US)

(73) Assignee: Michael Ferreira, Elmhurst, NY (US)

( * ) Notice: Subject to any disclaimer, the term of this patent is extended or adjusted under 35 U.S.C. 154(b) by 0 days.

(21) Appl. No.: 17/028,686

(22) Filed: Sep. 22, 2020

Related U.S. Application Data

(60) Provisional application No. 63/003,584, filed on Apr. 1, 2020.

(51) Int. Cl.
*A63B 7/02* (2006.01)
*A63G 9/12* (2006.01)
*A63B 21/00* (2006.01)
*A63B 21/16* (2006.01)

(52) U.S. Cl.
CPC ............... *A63B 7/02* (2013.01); *A63B 21/16* (2013.01); *A63B 21/4033* (2015.10); *A63G 9/12* (2013.01)

(58) Field of Classification Search
CPC . A63B 7/00–085; A63B 21/068; A63B 21/16; A63B 27/00–04; A63B 9/00–2009/004; A63G 9/00–22; A63G 31/00–16
See application file for complete search history.

(56) References Cited

U.S. PATENT DOCUMENTS

| | | | |
|---|---|---|---|
| 10,092,788 B2* | 10/2018 | O'Brien | A63B 7/00 |
| 2010/0089694 A1* | 4/2010 | Paul | A63B 27/00 |
| | | | 182/9 |
| 2016/0245503 A1* | 8/2016 | Benedict | F21V 23/008 |
| 2017/0319887 A1* | 11/2017 | O'Brien | A63B 7/02 |
| 2018/0185690 A1* | 7/2018 | Coulter | A63B 7/02 |
| 2020/0298041 A1* | 9/2020 | Liu | A63B 21/4035 |

* cited by examiner

*Primary Examiner* — Jennifer Robertson
(74) *Attorney, Agent, or Firm* — Staniford Tomita LLP

(57) ABSTRACT

A vertically supported swinging and climbing apparatus has two parallel sections of elongated webbing is a structure. The apparatus comprises pads secured around vertical supports. An elongated webbing wrapped around the pads on the vertical supports. The elongated webbing is configured with two parallel straight portion. Webbing couplings are attached to the straight portions of the elongated webbing to support swinging and climbing attachments.

18 Claims, 7 Drawing Sheets

SWINGING AND CLIMBING APPARATUS WITH VERTICALLY SUPPORTED PARALLEL WEBBING

CROSS REFERENCE TO RELATED APPLICATIONS

This application claims priority to U.S. Provisional Patent Application No. 63/003,584, "Swinging And Climbing Apparatus For Vertically Oriented Webbing" filed on Apr. 1, 2020 which is hereby incorporated by reference in its entirety.

BACKGROUND

Slacklines have become a popular outdoor activity. The slackline equipment includes an elongated flat webbing which is tensioned between two anchors. People can walk on the slacklines which can be between 1 and 2 inches in width with the width being parallel to the ground. A single webbing is in a flat horizontal orientation when the user walks on the webbing. The original uses for slacklines are limited. What is needed is are accessories which can allow the high strength elongated webbing to be used for other purposes.

SUMMARY OF THE INVENTION

An elevated webbing apparatus includes two parallel and horizontal sections of webbing supported by two vertical support structures which can be trees, poles, or other vertical structures. Pads made of a compressible material are secured around the vertical supports with coupling mechanisms. The webbing is wrapped 540 degrees or 180 degrees around the pads and vertical structures. The pads provide protection for the vertical supports from the tensioned webbing. The webbing is tensioned with a tensioning mechanism which compresses the webbing against the pads and vertical supports. The compression of the webbing and pad against the vertically supports results in friction forces which vertically support the webbing.

Swinging and climbing devices are coupled to the parallel sections of the webbing with webbing couplings. The webbing couplings can be high strength metal such as steel. The webbing couplings have slots and the webbing is passed through the slots to secure the webbing couplings to the webbing. The webbing couplings also have attachment loops which extend down from the webbing and are used to secure the swinging and climbing devices to the parallel sections of the webbing.

Various swinging and climbing attachment devices are mounted to the two parallel sections of webbing and the webbing is tensioned. The attachments include swings, bars, climbing ropes, hand hold loops, hand grab knots, climbing ropes with foot supports, and other devices. The swings each include a seat coupled to ropes coupled to the ends of the seats. The hang bars each include a cylindrical bar coupled to ropes coupled to the ends of the bar. The tops of the ropes are coupled to the webbing couplings mounted on the two parallel sections of the webbings. One rope supporting the swings and hang bars is coupled to a first parallel section of the webbing and the other rope supporting the swings and hang bars is coupled to a second parallel section of the webbing. In an embodiment, hand holds can be mounted to the ropes and positioned under the ends of the hang bar.

The hand loop attachments each include a rigid circular structure coupled to a rope coupled to a rope extending down from the webbing couplings. The hand grab knot includes a large rope knot on a lower end of a rope extending down from the webbing couplings. The climbing ropes can have annular foot supports that are mounted around the ropes. The foot supports can be uniformly spaced along the length of the climbing rope. The tops of the swinging and climbing attachment devices have loops that are coupled to the webbing coupling loops extending down from the webbing couplings mounted on the two parallel sections of webbing. In an embodiment, a loop.

DETAILED DESCRIPTION

Figure 1:
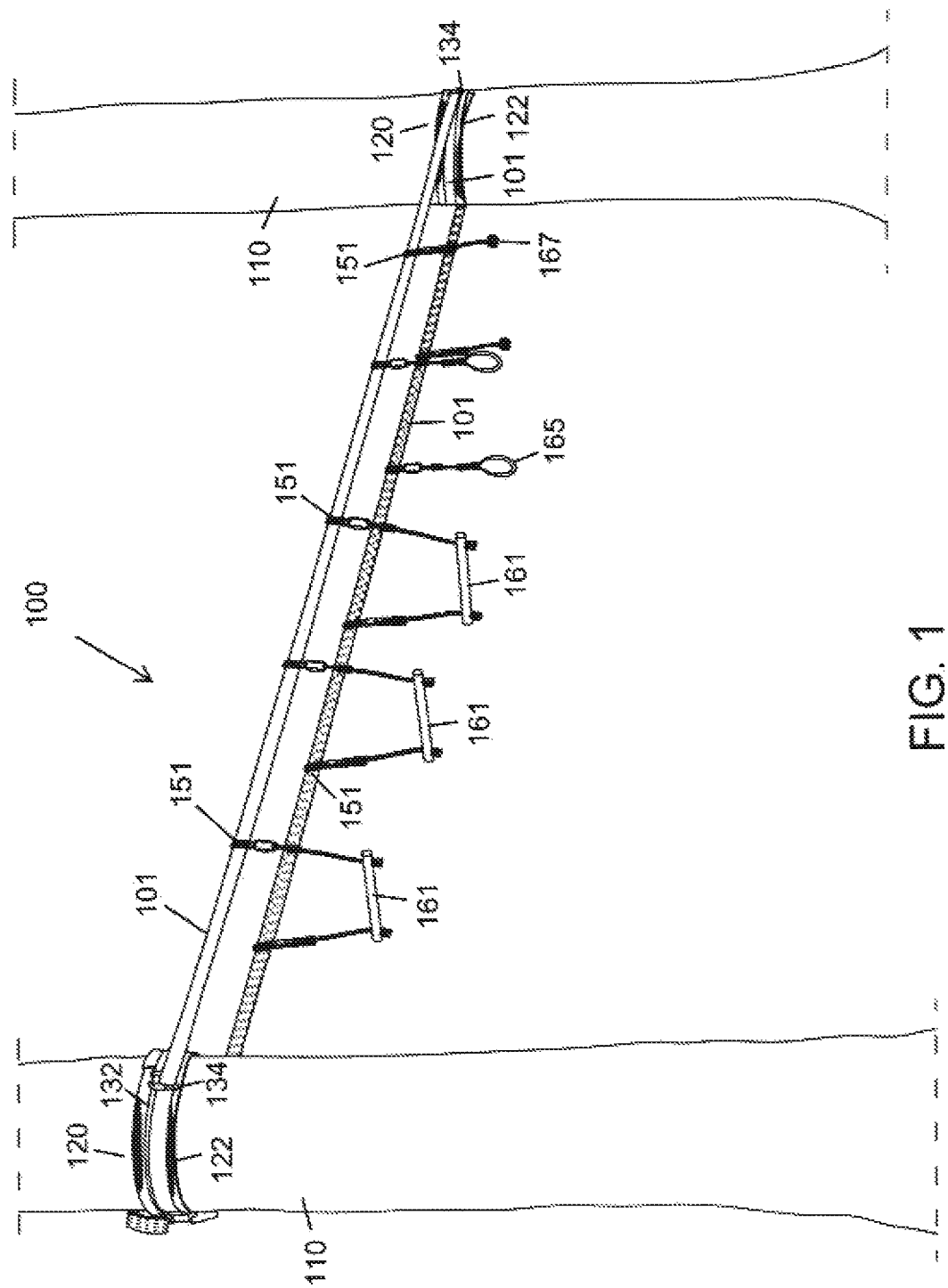
FIG. 1 illustrates an embodiment of the swinging and climbing apparatus mounted on two vertical supports.

FIG. 1 illustrates an embodiment of an apparatus 100 for supporting hand hold structures on an elongated webbing. The apparatus 100 includes support assemblies for the elongated webbing 101 which are mounted on vertical supports 110 which can be trees, poles, or other vertical support structures 110. In the illustrated example, the support assemblies are mounted on two trees which are substantially cylindrical in shape and have a textured bark surface. The support assemblies 120 can comprise a pad material 122 which is wrapped around the outer circumference of the support structure 110. In an embodiment, the pad material 122 can be an elongated strip which can be longer than the circumference of the support structure 110. In an embodiment, the pad material 122 can be wrapped in a one or more layers in a spiral manner which can create multiple layers of padding material 122.

The pad 122 can be held in place with a closure mechanism such as hook and loop such Velcro™. In an embodiment, the closure mechanism can be attached to an outer end of the pad 122 to secure the outer end of the pad 122 to the outer surface of the pad 122. In other embodiments, other types of closure mechanisms can be used to secure the pad 122 to the support structures 110. For example, the closure mechanism can be a closure band can be wrapped around the pad 122 and the support structure 110.

A belt 132 can be placed around the pad 122 to further secure the pad 122 to the vertical support structures 110 and the belt 132 can the threaded through support loops 134 can be placed on opposite sides of the vertical support structures 110. The loops 134 can be elongated structures with an elongated slot opening. The height of the openings in the loops 134 can be equal or slightly larger than the width of the elongated webbing 101 and the width of the slot can be large enough for the belt 132 and the elongated webbing 101 to through the slot simultaneously. Each belt 132 can pass through two more loops 134 which can be positioned on opposite sides of the vertical support structures 110 and surround the elongated webbing 101.

In another embodiment, the pad 122 can have an integrated belt into a single structure which can be referred to as an be pad 122 with integrated belt 132. The belt 132 can be sewn or otherwise bonded to the pad so that the pad 122 can be wrapped around the vertical support structure 110 and the belt 132 can be tightened to secure the pad 122 to the vertical support structure 110. Alternatively, a portion of the pad 122 can function as a belt 132 and the belt portion of the pad 122 can be tightened to secure the pad 122 to the vertical support structure 110.

In the illustrations, the belts 132 are used with the pads 122. However, in other embodiments, the belts 132 can be wrapped around the vertical support structures 110 without the pads 122. This can be appropriate when the vertical support structure 110 provides sufficient friction to vertically support the belt 132 and the webbing 101 and the vertical support structure 110 does not need to be protected. For example, where the vertical support structure 110 is a metal pole or a post. The belts 132 can still the threaded through the loops 134 and the elongated webbing 101 can be threaded through the loops 131 as described above.

In some embodiments, the elongated webbing 101 can wrap 180 degrees around the vertical support structures 110 and extend tangentially from the vertical support structures 110. In other embodiments, the elongated webbing 101 may wrap 1½ times (540 degrees) around the vertical support structures 110. The elongated webbing 101 can contact the belt 132 and opposite sides of the vertical support structures 110 and the loops 134 can be placed at the points on the belt 132 where the elongated webbing 101 extends away from the vertical support structures 110. The tension of the elongated webbing 101 causes the elongated webbing 101 to be compressed at the contact areas against the vertical support structures 110 and this compression can support the elongated webbing 101. However, if the tension of the elongated webbing 101 is reduced, the loops 134 will be able to support the elongated webbing 101.

Various attachments 161, 165, 167 can be coupled to the parallel lengths of the elongated webbing 101 between the vertical support structures 100. Couplings 151 can function as the interface between the elongated webbing 101 and the attachments. The couplings can have webbing slots and an attachment loop. The webbing slots are attached to the elongated webbing 101 in the vertical position. The couplings can be positioned at any position on the parallel lengths of the elongated webbing 101 between the vertical support structures 101. The attachments can include lockable metal loops such as carabiners or openable metal loops which can be securely attached to the loop portion of the couplings.

The elongated webbing 101 can be positioned at a height so that the user's feet are off the ground when the attachments are grasped. The user attachments can also be positioned in such a way that the user can swing from one hand hold to the next hand hold. In this example, the user can traverse the elongated webbing structure by starting at the first bar on left and then swinging to the second and third bars and then the hand ring and the rope knot.

Figure 3:
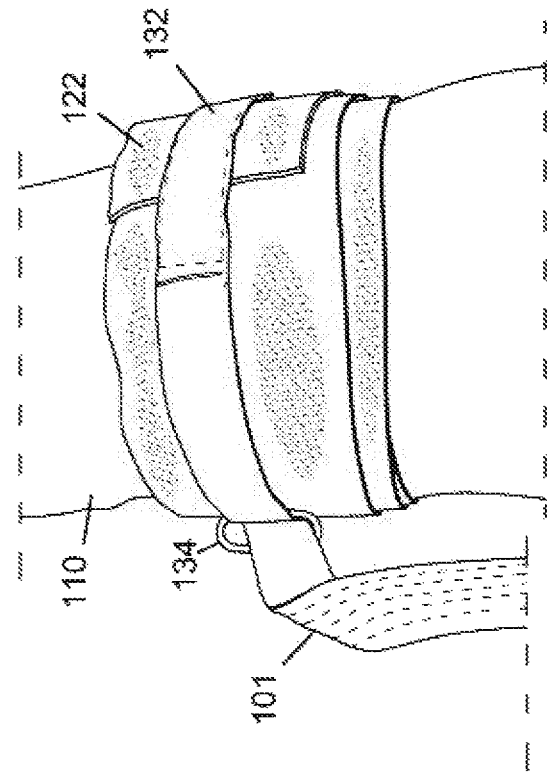
FIG. 3 illustrates an elongated webbing placed through a loop on the pad.
Figure 2:
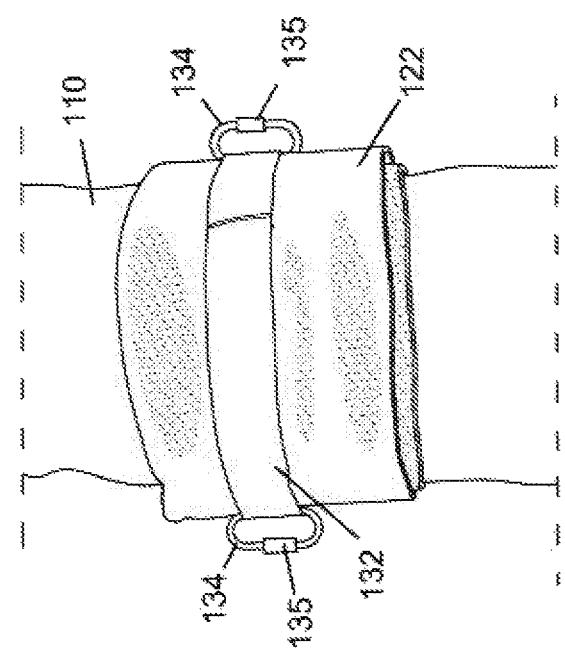
FIG. 2 illustrates a pad secured to a vertical support with a coupling mechanism and loops.
Figure 4:
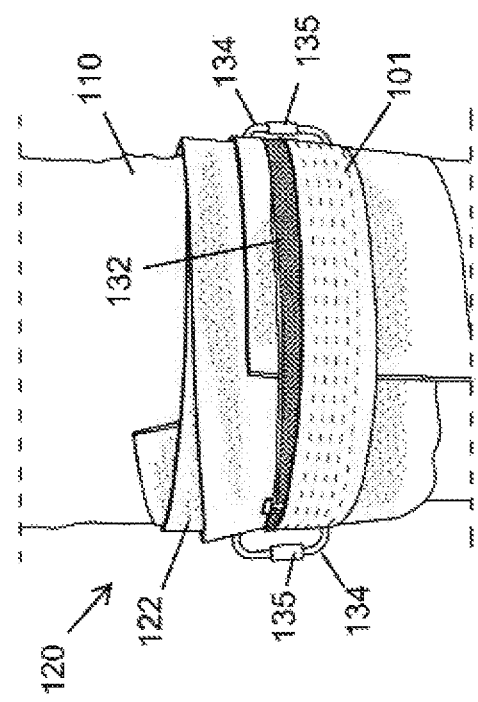
FIG. 4 illustrates an elongated webbing placed through two loops and secured around the pad.

FIGS. 2-4 illustrate an embodiment of a process for attaching the support assemblies 120 to the vertical supports 110. As illustrated in FIG. 2, the support assembly can include a pad 122 which is wrapped around the vertical support structures 110. The user can tension and wrap the pad 122 around the vertical support 110. The pad 122 can possibly be wrapped multiple times around the vertical support 110 creating a multi-layer pad 122 structure.

The pad 122 can also include a closure mechanism such as hook and loop systems like Velcro™ that can be used to secure the pad 122 around a vertical support such as a tree or pole. The entire pad 122 can function as a loop surface and a hook material can be attached to an end portion of the pad 122. The user can then press the hook material on an end of the pad 122 against the loop material of the pad 122. The can tightly wrap pad 122 on the vertical support 110 so the soft material can be pressed against the textured features of the vertical support 110 so that the pad 122 is held in place on the vertical support 110.

The pad 122 can be made of a soft material which can conform to the texture of the vertical support structures 110 and prevent damage to the vertical support structures 110. The pad 122 can be made of a porous material such as an unwoven polymer such as cellulose, nylon or spun polypropylene fiber that can be formed into an elastic and abrasive pad 122.

In a preferred embodiment, the vertical support structures 110 can be tree trunks. The pads 122 are placed directly against the trees at the desired elevation of the webbing 101. Vertical support structures 101 such as trees having a textured outer surface can be better at providing friction which can help to keep the support assemblies 120 and the webbing 101 in the elevated positions. In contrast, it may be difficult for a smooth pole to hold the support assemblies in the elevated position. For smooth poles, the pads 122 can be made of a rubber material that will not slide against the smooth surface when the webbing 101 is tensioned.

In an embodiment shown in FIG. 2, after the pad 122 is wrapped around the vertical support 110, a strap 132 can be wrapped around the pad 122. The strap 132 can be threaded through loops 134 that can be mounted on opposite sides of the vertical supports 110. The belt 132 can have a closure mechanism to secure the pads 122 to the vertical supports 110.

Figure 7:
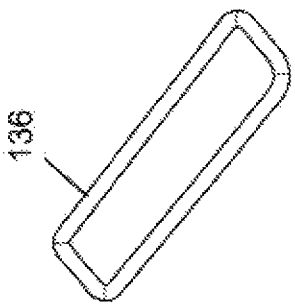
FIG. 7 illustrates an embodiment of a closed loop that can be attached to the pad on a vertical support.
Figure 6:
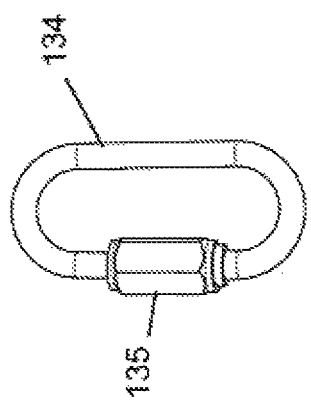
FIG. 6 illustrates an embodiment of a loop have a threaded cylinder opening that can be attached to the pad on a vertical support.

An examples of a loop 134 is shown in FIG. 6 which shows an openable threaded quick link 135. By unscrewing the threaded portion of the link 135, the loop 134 can be opened and the belt 132 and webbing 101 can be placed into the loop 134. The threaded portion of the link 135 can then be rethreaded to close the loop 134 to prevent the belt 132 and webbing 101 from being removed from the loop 134. FIG. 7 illustrates another simple closed loop 136 which can be a rigid rectangular loop structure which can be used instead of the loop 134 on the pad 122, belt 132 and webbing 101.

Once the required components are placed on the vertical support structures 110 and the webbing 101 is placed around the pads 122 on the vertical support structures 110 and webbing couplings 151 are properly positioned, the webbing 101 can be tensioned. A closure mechanism attached to an end of the strap 132 can be used to secure and tension the strap 122 around the pad 122 and vertical support 110. In an embodiment, the closure mechanism can be a hook and loop system where the loop surface is on a one surface of the strap 122 and the hook surface is on the opposite surface of the strap 132. The strap 132 can be tightly wrapped around the pad 122 and the hook material on the inner facing surface on an end portion of the strap 132 can be pressed into the loop material on the strap 132 to the pad 122 to the vertical support 110. The strap can be made of a webbing material which can be similar to the elongated webbing 101 that extends between the two vertical support structures 110.

Figure 5:
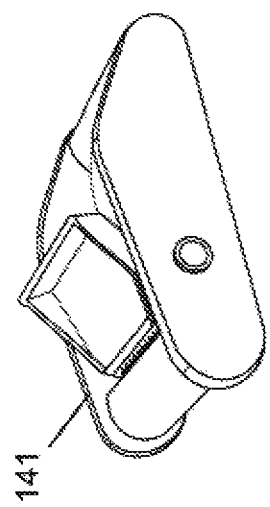
FIG. 5 illustrates an embodiment of a tensioning mechanism for tensioning the elongated webbing.

In other embodiments, the belt 132 can be secured around the pad 122 with a different mechanism such as the cam buckle 141 shown in FIG. 5. One end of the belt 132 can be coupled to an end of the cam buckle 141 and the opposite end of the belt 132 can be wrapped around the pad 122 and passed through the cam mechanism of the cam buckle 141. The user can tension the belt 132 to hold the pad 122 in place around on the vertical support 110.

In an embodiment, the user can place a number of webbing couplings 151 on the elongated webbing 101. The webbing 101 is then wrapped around the two vertical support structures 110 so that two portions of the elongated webbing 101 are parallel and straight. With reference to FIG. 4, the pad 122 and strap 132 with loops 134 have been secured to the vertical support 101. The elongated webbing 101 can then be threaded through the loops 134 and around the vertical supports 110. Before the elongated webbing 101 is tensioned, the webbing couplings 151 can be placed on the opposite parallel sides of the elongated webbing 101 and positioned to the desired positions.

Figure 8:
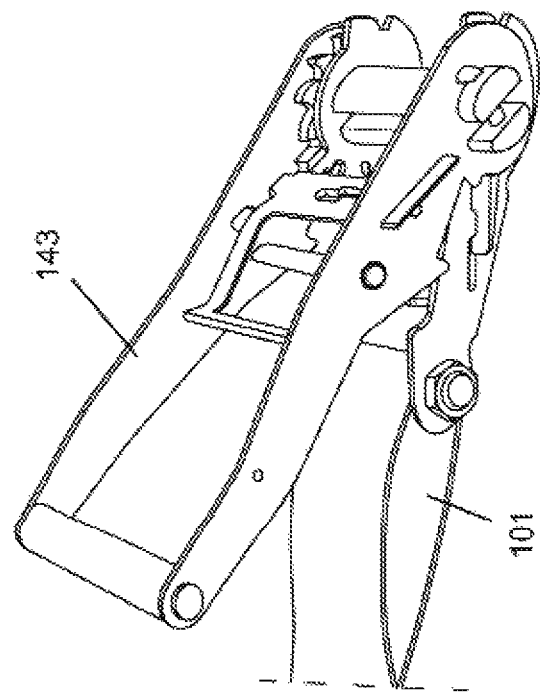
FIG. 8 illustrates an embodiment of a ratchet buckle tensioning mechanism for tensioning the elongated webbing.

The elongated webbing 101 is arranged in a vertical orientation between the vertical supports as shown in FIG. 1. After the system components are assembled on the vertical structures 110, the webbing 101 can be tensioned with a tensioning mechanism to compress the webbing 101 against the pad 132 and vertical supports 110. In a preferred embodiment, the tensioning mechanism can be a ratchet buckle mechanism 143 such as that shown in FIG. 8. The webbing 101 can be permanently attached to one portion and the loose end can be attached to a spool which is tensioned with a rotating handle. In other embodiments, the tensioning mechanism can include a cam buckle 141 such as shown in FIG. 5. One end of the elongated webbing 101 can be coupled to an end of the cam buckle 141 and the opposite end of the webbing 101 can be passed through the cam mechanism of the cam buckle 141. The user can tension the webbing 101 and use the tensioning mechanism to hold the loops in place around the pad 122 on the vertical support 110.

Figure 9:
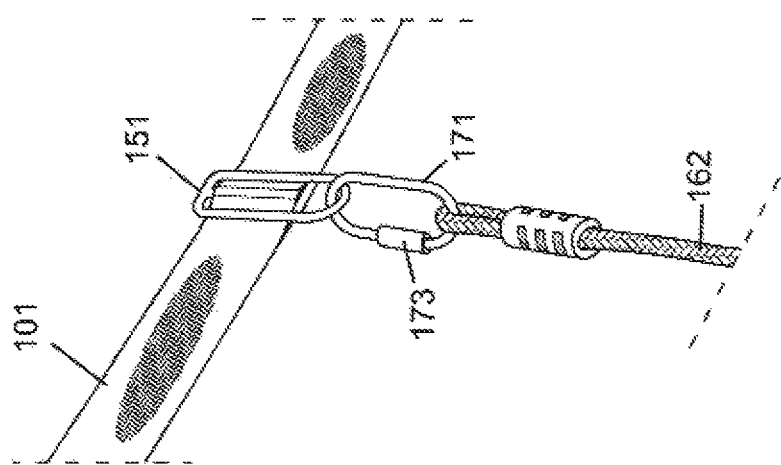
FIG. 9 illustrates an embodiment of a webbing coupling attached to the elongated webbing and a loop with a rope line attached to the webbing coupling.

The tension of the elongated webbing 101 against the support assembly can compress the pad 122 against the vertical support 110 resulting in a friction force against the vertical support 110. If there is insufficient elongated webbing 101 tension, then the loops 134 of the support assemblies 120 must support the entire weight and downward force applied to the elongated webbing 101 from users hanging on the attachments which can be bar, hand hold, ladder, swing, loop, rope knot, or other structures. FIG. 9 illustrates a webbing coupling 151 attached to the webbing 101, a linkage 171 coupled to the webbing coupling 151. A rope 162 is attached to the linkage 171 that can support attachments which can be bar, hand hold, ladder, swing, loop, rope knot, or other structures.

The vertical support force (the friction force that supports the elongated webbing 101) can be calculated by the pressure of the pad 122 against the vertical support structure times the coefficient of friction between the pad 122 and the vertical support structure. The "coefficient of friction" is a value that shows the relationship between two objects and the normal reaction between the objects that are involved. The coefficient of friction is shown by the equation $F_f = \mu N$. In that equation, the vertical support force is the frictional force $F_f$, the coefficient of static friction is $\mu$, and N is the normal force. The value of the coefficient of friction $\mu$ depends on the objects that are causing friction. The value is usually between 0 and 1. A $\mu$ value of 0 means there is no friction at all between the objects and a $\mu$ value of 1 means the frictional force is equal to the normal force. In this case, the normal force can be calculated based upon the tension of the webbing 101 which is: N=2× the tension force elongated webbing/((width of belt)×π×(Radius of vertical support)) or tension of the belt which is N=2× the tension force elongated webbing/((width of belt)×π×(Diameter of vertical support)). The value of N must be sufficiently high that $F_f$ is greater than the downward forces applied to the elongated webbing 101.

Figure 10:
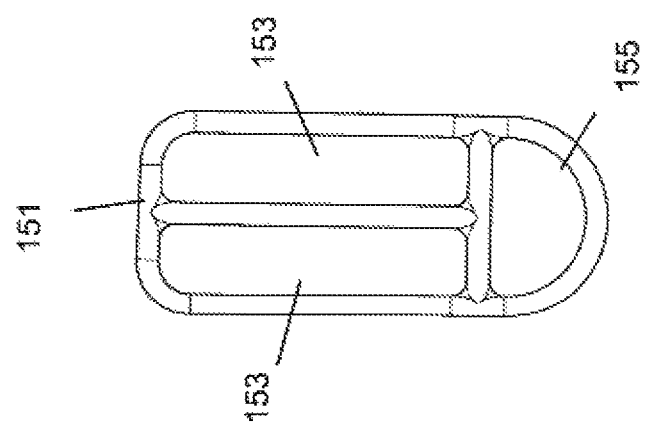
FIG. 10 illustrates an embodiment of a webbing coupling.

FIG. 10 illustrates an embodiment of a webbing coupling 151. In the illustrated embodiment, the webbing coupling 151 can be made of a high strength material such as steel. In this embodiment, the webbing coupling 151 has two webbing slots 153 above an attachment loop 155. The webbing is placed through the webbing slots 153. The two webbing slots 153 can be equal in length that is longer than the width of the webbing and a narrower width. The two webbing slots 153 can be adjacent and parallel to each other. The webbing slots 153 and attachment loop 155 are separated by metal material which can be weldable metal rod material. The webbing coupling 151 can have an elongated outer perimeter and an inverted "T" internal structure where the three ends of the T rigidly attached to the outer perimeter of the webbing coupling 151. The webbing coupling 151 can be made from various manufacturing methods. For example, metal bar rod stock which can be welded to create the webbing coupling 151.

In other embodiments, the webbing couplings 151 can be molded, stamped from metal sheet stock, machined from bar stock, 3D printed or any other suitable manufacturing method. As illustrated in FIG. 9, the elongated webbing 101 is threaded through the webbing slots 153 with the attachment loop 155 below the elongated webbing 101. As discussed, the elongated webbing 101 is tensioned between vertical support structures 110. In an embodiment, the webbing couplings 151 are attached to the elongated webbing 101 and moved to the desired positions. Once the elongated webbing 101 is properly setup, the elongated webbing 101 is tensioned and this tension holds the elongated webbing 101 to the support assemblies and the vertical support structures 110. The tension in the elongated webbing 101 may hold the webbing couplings 151 in place. It may be necessary to relieve the tension in the elongated webbing 101 in order to move the webbing couplings 151 on the parallel straight sections of the elongated webbing 101 and then retighten the elongated webbing 101 once the webbing couplings 151 have been repositioned to the desired attachment locations.

Figure 11:
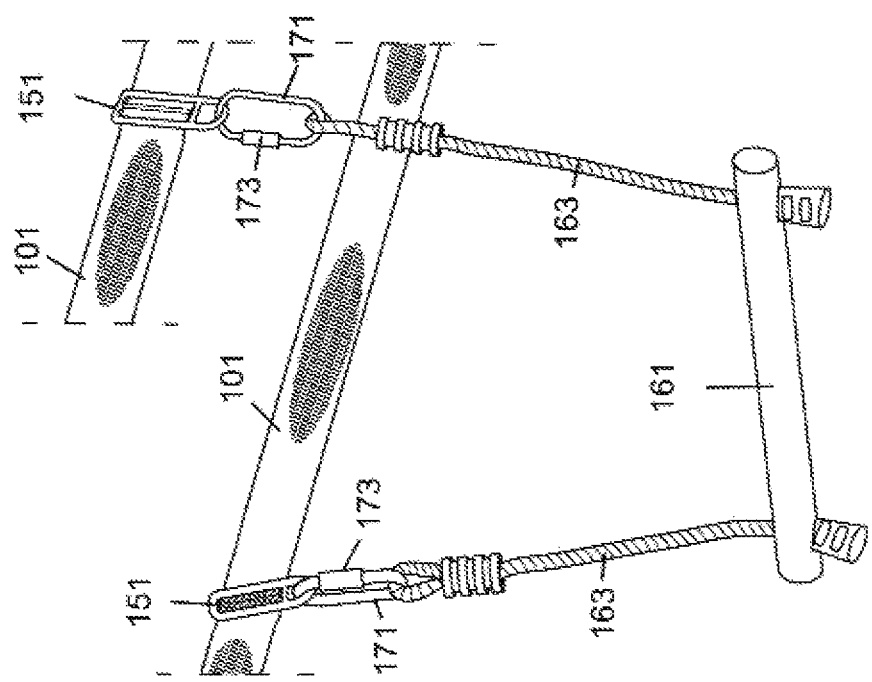
FIG. 11 illustrates an embodiment of a bar attachment coupled to webbing couplings and parallel portions of the elongated webbing.
Figure 13:
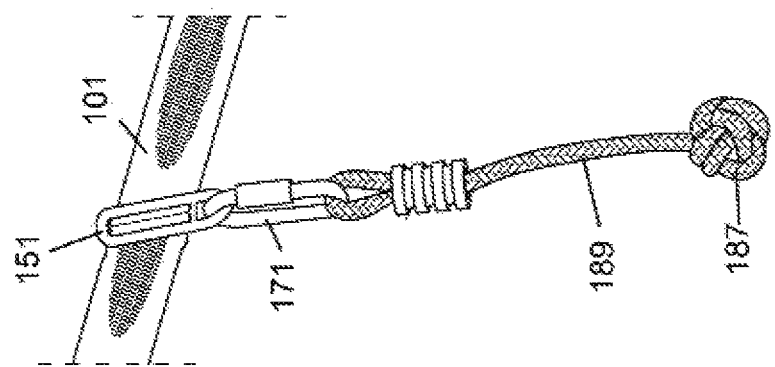
FIG. 13 illustrates an embodiment of a rope knot attachment coupled to a webbing coupling and the elongated webbing.
Figure 12:
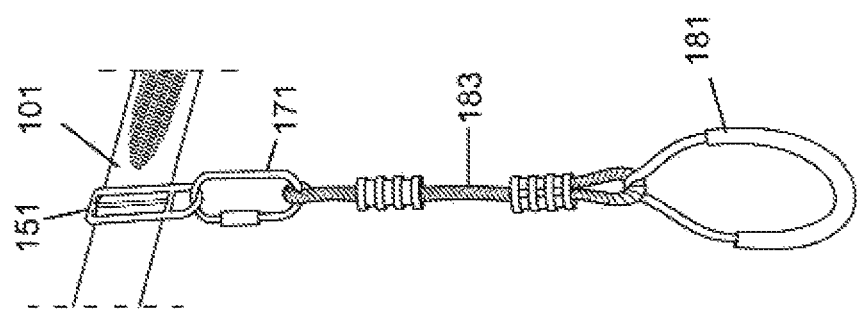
FIG. 12 illustrates an embodiment of a hand loop attachment coupled to a webbing coupling and the elongated webbing.

The attachments can be hand hold structures attached to the attachment loops 155 of the webbing couplings 151. FIGS. 11, 12 and 13 illustrate different hand hold attachment structures. FIG. 11 illustrates a bar structure which is a rigid elongated bar structure 161 which is attached to vertically oriented ropes 163 at opposite ends of the bar 161. In this example, the ropes 163 pass through holes through the diameter at the ends of the bar structure 161. The tops of the ropes 163 have loops which are attached to couplings 171 which can be loops which have a threaded cylinder opening/locking mechanism 173 as shown in FIG. 6. The couplings are opened and placed through the attachment loop and then closed and possibly locked to prevent the bar structure 161 from accidentally being removed from the webbing couplings 151. In some embodiments, it can be possible to have an adjustable length ropes 163 which can allow the user to adjust the vertical position of the bar 161 relative to the elongated webbing 101.

FIG. 12 illustrates a hand loop 181 which can be a rigid circular structure which can have a smooth plastic lower portion and a metal upper portion. The hand loop 181 is coupled to a rope 183 at a lower rope loop. The upper rope loop of the rope 183 is attached to a coupling 171 which is attached to the webbing couplings 151 on the webbing 101. FIG. 13 illustrates a hand hold rope ball knot 187 on a lower end of a rope 189 and a loop attached to a coupling 171 which is attached to the webbing couplings 151 on the webbing 101. In both FIGS. 12 and 13, the couplings 171 can be threaded loops shown in FIG. 6. The couplings 171 are opened and placed through the attachment loop of the webbing coupling 151 and then the couplings 171 can be closed and possibly locked to prevent the attachments from accidentally being removed. In an embodiment, the ropes 183, 189 can have a uniform length so that the hand hold structures the hand loop 181 and the rope knot 187 at the ends of the ropes are substantially the same height off the ground when they are attached to the elongated webbing 101 that is parallel with the ground. In other embodiments, it can be possible to have an adjustable length rope 183, 189 which can allow the user to adjust the vertical position of the hand hold structures the hand loop 181 and the rope knot 187 relative to the elongated webbing 101.

Figure 14:
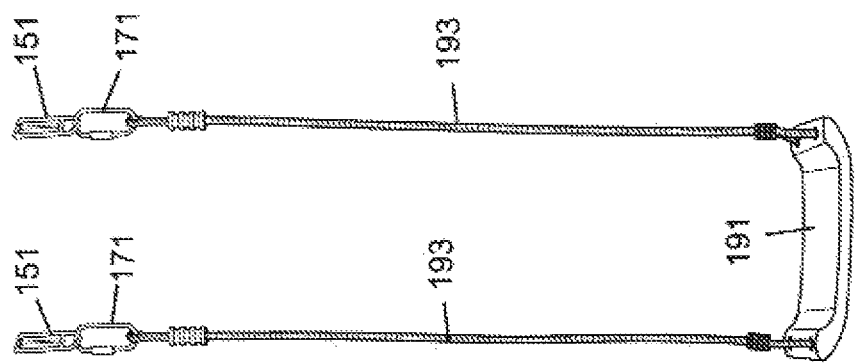
FIG. 14 illustrates an embodiment of a swing seat attachment.

FIG. 14 illustrates swing having a seat 191 which is supported by two ropes 193 on each side of the seat 191. A first rope 193 attached to the seat 191 can be attached to one of the parallel elongated webbing sections and a second rope 193 attached to the opposite side of the seat 191 can be attached to the other parallel elongated webbing section. The positions of the webbing couplings 151 can be moved so that the angle of the swing arc can be adjustable. More specifically, the swing can move in a path that is parallel to the lengths of the elongated webbing 101 sections or angled between about ±45 degrees relative to the lengths of the elongated webbing sections by altering the positions of the webbing couplings 151. Alternatively, if the user wants the swing to move in a path that is perpendicular to the lengths of the elongated webbing sections, the first rope 193 attached to the seat 191 can be attached to one of the parallel elongated webbing 101 sections and a second rope 193 attached to the opposite side of the seat 191 can be attached to the same elongated webbing 101. In the illustrated example, the lengths of the ropes 193 can be about 2.6 meters in length, but in other embodiments, the seat 191 can be supported by any other length of rope 193. In some embodiments, it can be possible to have an adjustable length ropes 193 which can allow the user to adjust the vertical position of the seat 191 relative to the ground and the elongated webbing 101.

Figure 15:
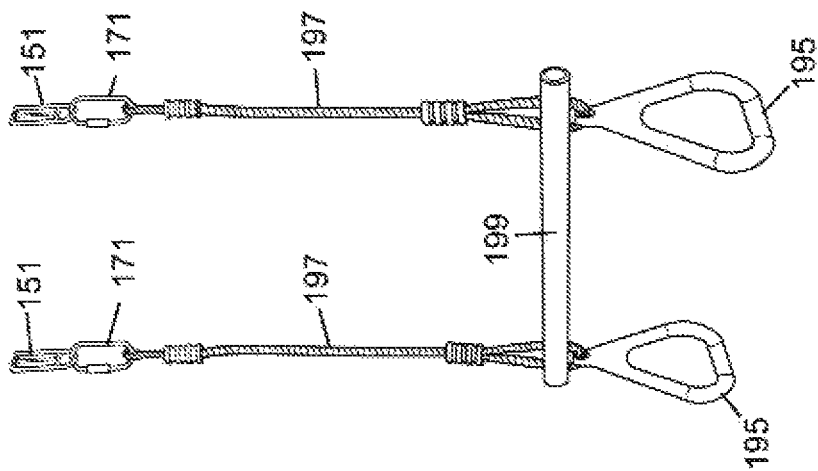
FIG. 15 illustrates an embodiment of a bar and hand grips attachment.

FIG. 15 illustrates a bar 199 which is supported by two ropes 197 and two hand holds 195 under each end of the bar 199. In this example, the bar 199 is a cylindrical wooden rod with two holes extending through the diameter of the bar 199 at each of the ends. The ropes 197 extend down through a first hole in the bar 199 and through a hole in the top of the hand hold 195 and then back up through the second hole. The hand hold 195 can be triangular in shape with rounded corners. The end of the rope 197 can be secured to the rope 197 above the bar 199. The hand holds 195 can each have a horizontal hand hold surfaces which are perpendicular to the horizontal bar 199. In this example, the hand holds 195 are triangular but in other embodiments, the hand holds 195 can be any other geometric shape such as circular, rectangular, semicircular, etc. In this embodiment, the hand hold 195 can be about 36 cm below the upper end of the rope 197 which is coupled to the webbing couplings 151. In some embodiments, it can be possible to have an adjustable length ropes 197 which can allow the user to adjust the vertical position of the bar 199 and hand holds 195 relative to the ground and elongated webbing 101.

Figure 16:
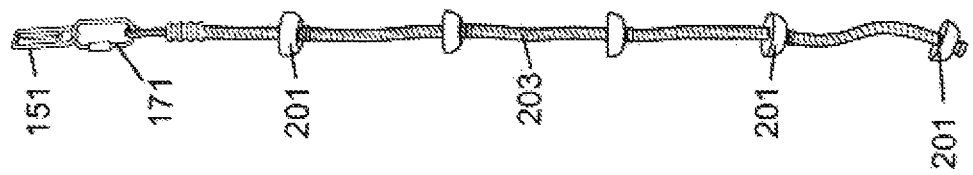
FIG. 16 illustrates an embodiment of a rope attachment having a plurality of foot supports.

FIG. 16 illustrates a rope 203 having a plurality of foot supports 201 which can be circular structures which can be about 1.5 inches thick and 3 inches in diameter. The foot holds 201 can be annular in shape and the rope 203 can pass through the center holes of the foot holds 201. The rope 203 can have rings which are secured around the outer diameter of the rope 203. The outer diameter of the rings are larger than the inner diameters of the holes in the foot holds 201, so the rings hold the foot holds 201 in specific vertical positions on the rope 197. For example, in an embodiment, the foot holds 201 can be evenly spaced on the rope 203 at 0.4 meter intervals. The rope 203 can be 2 meters in length with the upper end of the rope 203 attached to the coupling 171 and the webbing coupling 151. The webbing 101 and the top of the rope 203 can be positioned over 2 meters above the ground. In other embodiments, any other type of known hanging attachment can be coupled to the webbing couplings 151 and used to support users.

There are various differences between slacklining and known slacklining hanging accessory systems. As discussed slacklining systems use single line webbing that is oriented with the webbing in a horizontal configuration so that the user is walking on a flat horizontal support surface. A webbing system used for hanging accessories is disclosed by U.S. Pat. No. 10,092,788 to O'Brien. This patent discloses a webbing system which uses two elongated webbings which are coupled together along the length of the webbing. This structure has "pockets" which are passageway regions where the two elongated webbings do not contact each other. The pockets can be formed at uniform intervals along the length of the two elongated webbings structure. The patent describes "hangers" which are placed through the pockets and used to support various accessories. In contrast, to slacklining and U.S. Pat. No. 10,092,788 which use horizontally oriented elongated webbing, the described system uses two parallel webbings which are both in a vertical orientation. The webbing couplings are specifically designed to be attached to the webbing so that the attachment loops are below the elongated webbing.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention and some of its advantages have been described in detail for some embodiments. It should be understood that although the process is described with reference to a device, system, and method the process may be used in other contexts as well. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. An elevated webbing apparatus comprising:
a first pad secured around a first vertical support;
a second pad secured around a second vertical support;
an elongated webbing wrapped around the first pad and the second pad wherein a first straight portion of the elongated webbing extends between a first side of the first vertical support structure and a first side of the second vertical support structure, a second straight portion of the elongated webbing extending between a second side of the first vertical support structure and the second side of the second vertical support structure, and the first straight portion of the elongated webbing is parallel with and spaced apart from the second straight portion of the elongated webbing;
a first webbing coupling attached to the first straight portion of the elongated webbing;
a second webbing coupling attached to the second straight portion of the elongated webbing; and
an attachment coupled to both the first webbing coupling and the second web coupling.

2. The apparatus of claim 1 wherein a first friction force between the first pad against the first vertical support and a second friction force between the second pad against the second vertical support provides vertical support for the elongated webbing.

3. The apparatus of claim 1 further comprising:
a first belt wrapped around the first vertical support; and
a second belt wrapped around the second vertical support.

4. The apparatus of claim 1 wherein the attachment comprises a bar structure coupled to a first line coupled to the first webbing coupling and a second line coupled to the second webbing couplings.

5. The apparatus of claim 1 wherein the attachment comprises a swing seat coupled to a first line coupled to the first webbing coupling and a second line coupled to the second webbing couplings.

6. The apparatus of claim 1 further comprising:
a second attachment having a first rigid circular structure coupled to a first line coupled to the first webbing; and
a third attachment having a second rigid circular structure coupled to the second webbing.

7. The apparatus of claim 1 further comprising:
a second attachment having a first rope ball coupled to a first line coupled to the first webbing; and
a third attachment having a second rope ball coupled to the second webbing.

8. The apparatus of claim 1 wherein the first webbing slot has a first length which is adjacent to and parallel with the second webbing slot and the attachment loop is adjacent to lower edges of the first webbing slot and the second webbing slot.

9. The apparatus of claim 1 wherein the first webbing slot has a first length which is adjacent to and parallel with the second webbing slot and the attachment loop is adjacent to lower edges of the first webbing slot and the second webbing slot.

10. An elevated webbing apparatus comprising:
a first elongated pad secured around a first vertical support;
an elongated webbing wrapped around the first pad wherein a first straight portion of the elongated webbing extends from a first side of the first vertical support structure and a second straight portion of the elongated webbing extends from a second side of the first vertical support structure that is opposite the first side of the first vertical support structure wherein the first straight portion of the elongated webbing is parallel to and spaced apart from the second straight portion of the elongated webbing;
a first webbing coupling attached to the first straight portion of the elongated webbing;
a second webbing coupling attached to the second straight portion of the elongated webbing; and
an attachment coupled to both the first webbing coupling and the second web coupling.

11. The apparatus of claim 10 further comprising:
a second elongated pad secured around a second vertical support;
wherein the elongated webbing is wrapped around the second pad wherein the first straight portion of the elongated webbing extends from a first side of the second vertical support structure and the second straight portion of the elongated webbing extends from a second side of the second vertical support structure that is opposite the first side of the second vertical support structure.

12. The apparatus of claim 10 further comprising:
a first webbing loop coupled to the first pad wherein the elongated webbing is threaded through the first webbing loop.

13. The apparatus of claim 10 wherein the attachment comprises a bar structure coupled to a first line coupled to the first webbing coupling and a second line coupled to the second webbing couplings.

14. The apparatus of claim 10 wherein the attachment comprises a swing seat coupled to a first line coupled to the first webbing coupling and a second line coupled to the second webbing couplings.

15. The apparatus of claim 10 further comprising:

a second attachment having a first rigid circular structure coupled to a first line coupled to the first webbing coupling and a second rigid circular structure coupled to the second webbing couplings.

16. The apparatus of claim 10 further comprising:

a second attachment having a first rope ball coupled to a first line coupled to the first webbing coupling and a second rope ball coupled to the second webbing couplings.

17. The apparatus of claim 10 wherein the elongated webbing is wrapped 180 degrees around the first vertical support.

18. The apparatus of claim 10 wherein the elongated webbing is wrapped 540 degrees around the first vertical support.

* * * * *